(12) United States Patent
Minamida

(10) Patent No.: US 11,349,176 B2
(45) Date of Patent: May 31, 2022

(54) SEPARATOR FOR ALL-SOLID-STATE BATTERIES, METHOD FOR PRODUCING THE SAME, AND ALL-SOLID-STATE BATTERY

(71) Applicant: TOYOTA JIDOSHA KABUSHIKI KAISHA, Toyota (JP)

(72) Inventor: Yoshitaka Minamida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 339 days.

(21) Appl. No.: 16/718,491

(22) Filed: Dec. 18, 2019

(65) Prior Publication Data

US 2020/0203696 A1 Jun. 25, 2020

(30) Foreign Application Priority Data

Dec. 20, 2018 (JP) .............................. JP2018-238062

(51) Int. Cl.
*H01M 50/449* (2021.01)
*H01M 10/0585* (2010.01)
(Continued)

(52) U.S. Cl.
CPC ..... *H01M 50/449* (2021.01); *H01M 10/0562* (2013.01); *H01M 10/0585* (2013.01);
(Continued)

(58) Field of Classification Search
CPC ............. H01M 50/449; H01M 50/403; H01M 50/446; H01M 10/0562; H01M 10/0585; H01M 2300/0068; H01M 2300/0094
See application file for complete search history.

(56) References Cited

U.S. PATENT DOCUMENTS

2010/0055565 A1  3/2010  Naoi et al.
2014/0004257 A1* 1/2014  Kubo ................. H01M 10/056
                                            427/126.1
(Continued)

FOREIGN PATENT DOCUMENTS

JP  2003-132877 A  5/2003
JP  2010-061912 A  3/2010
(Continued)

*Primary Examiner* — Matthew J Merkling
(74) *Attorney, Agent, or Firm* — Sughrue Mion, PLLC

(57) ABSTRACT

To provide a separator for all-solid-state batteries, which is configured to achieve both increased tensile strength and excellent ion conductivity, a method for producing the same, and an all-solid-state battery comprising the separator for all-solid-state batteries. Disclosed is a separator for all-solid-state batteries, the separator comprising a first solid electrolyte layer comprising a solid electrolyte and a hydrogenated rubber-based resin where a content of the hydrogenated rubber-based resin in the first solid electrolyte layer is 15% by volume or more and 30% by volume or less, and the separator optionally further comprising, on at least one surface of the first solid electrolyte layer, a second solid electrolyte layer comprising a solid electrolyte and a hydrogenated rubber-based resin where a content of the hydrogenated rubber-based resin in the second solid electrolyte layer is 0.1% by volume or more and less than 15% by volume.

4 Claims, 3 Drawing Sheets

(51) Int. Cl.
*H01M 10/0562* (2010.01)
*H01M 50/403* (2021.01)
*H01M 50/446* (2021.01)

(52) U.S. Cl.
CPC ....... *H01M 50/403* (2021.01); *H01M 50/446* (2021.01); *H01M 2300/0068* (2013.01); *H01M 2300/0094* (2013.01)

(56) References Cited

U.S. PATENT DOCUMENTS

| | | | |
|---|---|---|---|
| 2014/0120427 A1* | 5/2014 | Suyama | H01M 10/0562 429/306 |
| 2015/0147659 A1* | 5/2015 | Kato | H01M 4/049 429/304 |
| 2017/0133710 A1* | 5/2017 | Yoon | H01M 10/0562 |
| 2017/0214051 A1 | 7/2017 | Yoon et al. | |
| 2019/0081352 A1* | 3/2019 | Sasaki | H01M 10/052 |

FOREIGN PATENT DOCUMENTS

| | | |
|---|---|---|
| JP | 2012-054000 A | 3/2012 |
| JP | 2013-115022 A | 6/2013 |
| JP | 2013-218926 A | 10/2013 |
| JP | 2015-216127 A | 12/2015 |
| JP | 2017-135094 A | 8/2017 |
| JP | 2018-521173 A | 8/2018 |
| WO | 2013/001623 A1 | 1/2013 |
| WO | 2016/210371 A1 | 12/2016 |

* cited by examiner

SEPARATOR FOR ALL-SOLID-STATE BATTERIES, METHOD FOR PRODUCING THE SAME, AND ALL-SOLID-STATE BATTERY

TECHNICAL FIELD

The disclosure relates to a separator for all-solid-state batteries, a method for producing the same, and an all-solid-state battery.

BACKGROUND

A combustible organic solvent is not used in an all-solid-state battery in which a solid electrolyte is used in place of a liquid electrolyte (e.g., an all-solid-state lithium secondary battery). Accordingly, the battery is thought to be able to realize simplification of safety devices and to be excellent in production costs and productivity.

The components of such an all-solid-state battery, that is, the cathode, anode and electrolyte of the all-solid-state battery are all solid. Accordingly, for example, compared to a lithium secondary battery in which an organic electrolytic solution is used, the all-solid-state battery has a tendency to have large electrical resistance and provide small output current.

Accordingly, to increase the output current of the all-solid-state lithium secondary battery, a high-ion-conductive electrolyte may be used.

Meanwhile, there are attempts to add a polymer as a binder to an electrode layer or a solid electrolyte layer that is used as a separator for all-solid-state batteries. By the addition of the polymer, the layer can obtain flexibility and, as a result, better processability and formability.

For example, as an attempt to add a polymer as a binder to a solid electrolyte layer that is used as a separator for all-solid-state batteries, Patent Literature 1 discloses a solid battery comprising a cathode-side electrolyte layer (an electrolyte layer disposed on the cathode side) and an anode-side electrolyte layer (an electrolyte layer disposed between the cathode-side electrolyte layer and the anode), the cathode-side electrolyte layer comprising an electrolyte and a binder that contains a fluorine-based copolymer containing tetrafluoroethylene, and the anode-side electrolyte layer comprising an electrolyte and a butadiene rubber-based binder. Patent Literature 1 states that better battery performance can be obtained by this structure.

Patent Literature 2 discloses a method for manufacturing an electrode for solid-state batteries, in which the amount of a binder that is used in the step of producing an active material composition capable of suppressing uneven solid electrolyte distribution, is approximately the same as the amount of a binder that is added in the step of producing an electrode composition. Patent Literature 2 states that uneven solid electrolyte distribution can be suppressed by this method.

Patent Literature 3 discloses that in a solid electrolyte layer comprising a solid electrolyte and inorganic particles for forming pores for impregnating the solid electrolyte with an electrolytic solution, the weight ratio of the inorganic particles to a binder may be between 55:45 and 90:10, or it may be between 60:40 and 85:15. In Patent Literature 3, silicon oxide, calcium carbonate, talcite, barium titanate and the like are disclosed as the inorganic particles, and polyvinylidene fluoride, butadiene rubber, epoxy resin, polyamideimide, polyimide and the like are disclosed as the binder.

Patent Literature 4 discloses an electrode active material slurry comprising a cluster complex and a slurry solution, the cluster complex comprising an electrode active material, a solid electrolyte, a conductive material and a first binder, and the slurry solution comprising a solvent and a second binder. Also, Patent Literature 4 discloses that the first binder may have a content of from 1% by weight to 5% by weight based on 100% by weight of a mixture of the active material and the solid electrolyte, and the second binder may have a content of from 1% by weight to 10% by weight based on 100% by weight of a mixture of the active material and the solid electrolyte.

Patent Literature 5 discloses an all-solid type lithium secondary battery in which styrene-butadiene rubber is used as a binder in at least the cathode material of the cathode and anode materials of the battery, whereby an irreversible deformation attributed to a solvent that is used to dissolve a high molecular solid electrolyte, is suppressed when introducing the electrolyte, and the exfoliation of the electrolyte from the electrode material and the swelling of the electrolyte, are prevented. Also, Patent Literature 5 discloses that the percentage of the binder may be 0.5% to 5% with respect to the total weight of an active material, a conductive material and the binder.

Patent Literature 6 discloses that a cathode mixture layer is formed by dispersing an ion conductive polymer, a binder, an electrolyte salt, cathode active material particles and a conductive additive. Also, Patent Literature 6 states that the percentage of the binder in the cathode mixture layer may be in a range of 1% by weight or more and less than 3% by weight.

Patent Literature 7 discloses electrochemical cells which comprise a cathode, an anode and a composite electrolyte layer comprising a polymer and an inorganic solid state electrolyte, and in which the volumetric ratio of the inorganic solid state electrolyte to the polymer is greater than 1, and the cathode and the anode directly contact the inorganic solid state electrolyte. Also, Patent Literature 7 discloses that the volumetric ratio of the inorganic solid state electrolyte to the polymer may be between 99:1 and 51:49. In Patent Literature 7, however, there is no disclosure of a hydrogenated rubber-based resin as the polymer.

Patent Literature 8 discloses a method for manufacturing an electrode. Also, Patent Literature 8 discloses that a binder for an active material layer contains styrene-butadiene rubber and carboxymethyl cellulose, and a binder for a solid polyelectrolyte layer contains at least one of polyvinylidene fluoride and polyethylene oxide.

Patent Literature 1: Japanese Patent Application Laid-Open (JP-A) No. 2015-216127
Patent Literature 2: JP-A No. 2013-115022
Patent Literature 3: JP-A No. 2013-218926
Patent Literature 4: JP-A No. 2017-135094
Patent Literature 5: JP-A No. 2012-054000
Patent Literature 6: JP-A No. 2003-132877
Patent Literature 7: Japanese translation of PCT International Application No. 2018-521173
Patent Literature 8: JP-A No. 2010-061912

As described above, to increase the output current of all-solid-state batteries, there is a demand for a high ion-conductive solid electrolyte layer that is used as a separator for all-solid-state batteries. In general, the ion conductivity of a solid electrolyte layer varies depending on the amount of the binder added to the solid electrolyte. However, if the amount of the binder is decreased to increase the ion conductivity of the solid electrolyte layer as much as possible, there is a problem in that the solid electrolyte layer is broken or cracks when tension is applied to the solid electrolyte layer in production steps.

A conventional solid electrolyte layer used as a separator for all-solid-state batteries, needs to be improved to achieve both increased tensile strength and excellent ion conductivity.

SUMMARY

In light of the above circumstances, an object of the disclosed embodiments is to provide a separator for all-solid-state batteries, which is configured to achieve both increased tensile strength and excellent ion conductivity, a method for producing the same, and an all-solid-state battery comprising the separator for all-solid-state batteries.

In a first embodiment, there is provided a separator for all-solid-state batteries, the separator comprising a first solid electrolyte layer comprising a solid electrolyte and a hydrogenated rubber-based resin where a content of the hydrogenated rubber-based resin in the first solid electrolyte layer is 15% by volume or more and 30% by volume or less, and the separator optionally further comprising, on at least one surface of the first solid electrolyte layer, a second solid electrolyte layer comprising a solid electrolyte and a hydrogenated rubber-based resin where a content of the hydrogenated rubber-based resin in the second solid electrolyte layer is 0.1% by volume or more and less than 15% by volume.

The solid electrolyte of the first solid electrolyte layer and that of the second solid electrolyte layer may comprise a sulfide solid electrolyte comprising $Li_2S$, $P_2S_5$, LiI and LiBr.

In another embodiment, there is provided a method for producing the separator for all-solid-state batteries according to the disclosed embodiments, the method comprising:

preparing a solid electrolyte layer forming slurry comprising a solid electrolyte, a hydrogenated rubber-based resin and a dispersion medium, forming a precursor film by applying the solid electrolyte layer forming slurry on a support and drying the applied slurry, and pressing the precursor film at a temperature which is 0° C. or more, which is less than a decomposition temperature of the hydrogenated rubber-based resin, and which is less than a crystallization temperature of the solid electrolyte.

In another embodiment, there is provided an all-solid-state battery comprising a cathode layer, an anode layer, and a separator for all-solid-state batteries, which is disposed between the cathode layer and the anode layer, wherein the separator for all-solid-state batteries is the separator for all-solid-state batteries according to the disclosed embodiments.

According to the disclosed embodiments, the separator for all-solid-state batteries, which is configured to achieve both increased tensile strength and excellent ion conductivity, the method for producing the same, and the all-solid-state battery comprising the separator for all-solid-state batteries, can be provided.

BRIEF DESCRIPTION OF THE DRAWINGS

In the accompanying drawings.

DETAILED DESCRIPTION

1. Separator for all-Solid-State Batteries

Figure 1:
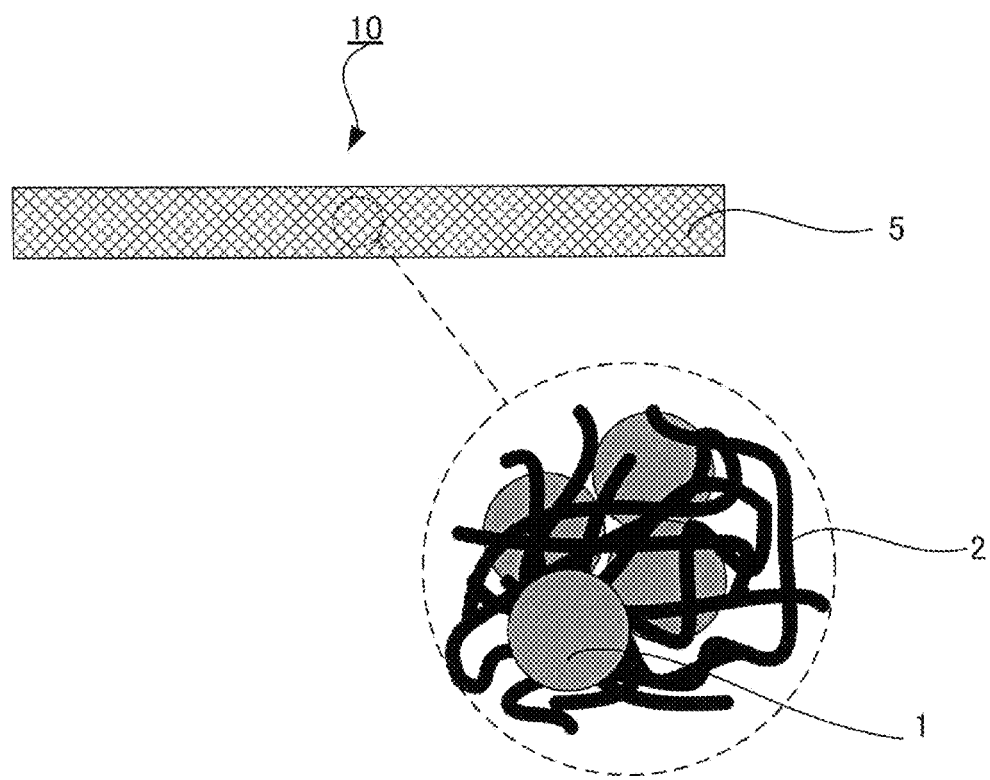
FIG. 1 is a schematic sectional view of an example of the structure of the separator for all-solid-state batteries according to the disclosed embodiments.

The separator for all-solid-state batteries according to the disclosed embodiments is a separator for all-solid-state batteries, the separator comprising a first solid electrolyte layer comprising a solid electrolyte and a hydrogenated rubber-based resin where a content of the hydrogenated rubber-based resin in the first solid electrolyte layer is 15% by volume or more and 30% by volume or less, and the separator optionally further comprising, on at least one surface of the first solid electrolyte layer, a second solid electrolyte layer comprising a solid electrolyte and a hydrogenated rubber-based resin where a content of the hydrogenated rubber-based resin in the second solid electrolyte layer is 0.1% by volume or more and less than 15% by volume.

The separator for all-solid-state batteries according to the disclosed embodiments comprises the first solid electrolyte layer. The first solid electrolyte layer is a solid electrolyte layer comprising a solid electrolyte and a hydrogenated rubber-based resin where the content of the hydrogenated rubber-based resin in the solid electrolyte layer is 15% by volume or more and 30% by volume or less. Accordingly, the separator for all-solid-state batteries according to the disclosed embodiments can be a separator for all-solid-state batteries, which is a solid electrolyte layer configured to achieve both increased tensile strength and excellent ion conductivity.

In general, the solid electrolyte is in a particulate form. When a small amount of binder is added, the tensile strength of the solid electrolyte layer mainly depends on the adhesion strength of an interface between the solid electrolyte particles. Accordingly, it seems that the adhesion strength of the solid electrolyte particles is reflected as it is in the tensile strength, thereby decreasing the tensile strength. When the amount of the added binder is equal to or less than a certain amount, for example, the binder is consumed to fill spaces between the solid electrolyte particles. In this case, the addition of the binder is less effective in increasing the adhesion strength and increasing the tensile strength of the solid electrolyte layer.

On the other hand, when the added binder amount is more than the certain amount, the addition of the binder is effective in increasing the adhesion strength and increasing the tensile strength of the solid electrolyte layer. However, when the added binder amount is too large, the percentage of the solid electrolyte in the solid electrolyte layer decreases to decrease the ion conductivity of the solid electrolyte layer.

In the case of a resin binder which has a small Young's modulus and which is likely to deform at low load, by adding a relatively small amount of the resin binder, the network of the binder itself can be easily constructed, and it seems easy to reflect the properties of the binder in the tensile strength. In the case of a resin binder which has a large Young's modulus, the network of the binder itself cannot be easily constructed without the addition of a large amount of the binder. Accordingly, it seems difficult to reflect the properties of the binder in the tensile strength.

Meanwhile, in the disclosed embodiments, the hydrogenated rubber-based resin is used as the binder of the solid electrolyte layer. The hydrogenated rubber-based resin shows large tensile elongation, and the network of the binder itself can be easily constructed by adding a relatively small amount of the binder. In the case of a rubber-based resin containing many unsaturated bonds, since the resin easily reacts with oxygen and sulfur atoms contained in the solid electrolyte, it may fail to show its inherent rubber elasticity. Meanwhile, the hydrogenated rubber-based resin can retain, by hydrogenating unsaturated bonds, excellent rubber properties that are inherent in the rubber. Accordingly, the hydrogenated rubber-based resin can show large tensile elongation; the network of the binder itself can be easily constructed by adding the relatively small amount of the hydrogenated rubber-based resin; and the large tensile elongation properties can be reflected in the tensile strength of the electrolyte layer. Accordingly, even in the case of the addition of 15% by volume, which is less effective in increasing the adhesion and tensile strength of the solid electrolyte layer in the case of a resin binder having a large Young's modulus (e.g., polyvinylidene fluoride), the hydrogenated rubber-based resin seems to be effective in increasing the adhesion and tensile strength of the solid electrolyte layer of the disclosed embodiments. Also in the disclosed embodiments, since the network of the binder itself is constructed by the addition of the relatively small amount of the binder, a decrease in the ion conductivity of the solid electrolyte layer, which is due to the addition of the binder, seems to be suppressed.

Examples of the separator for all-solid-state batteries according to the disclosed embodiments, will be described with reference to figures. In the accompanying drawings, for ease of illustration and understanding, components shown in the figures are appropriately scaled down, or the horizontal to vertical dimensional ratio of the components is changed from the actual ratio and exaggerated.

FIG. 1 is a schematic sectional view of an example of the structure of the separator for all-solid-state batteries according to the disclosed embodiments. A separator 10 for all-solid-state batteries shown in FIG. 1 comprises a first solid electrolyte layer 5 comprising a solid electrolyte 1, which is in a particulate form, and a hydrogenated rubber-based resin 2 bonding the solid electrolyte particles.

Figure 2:
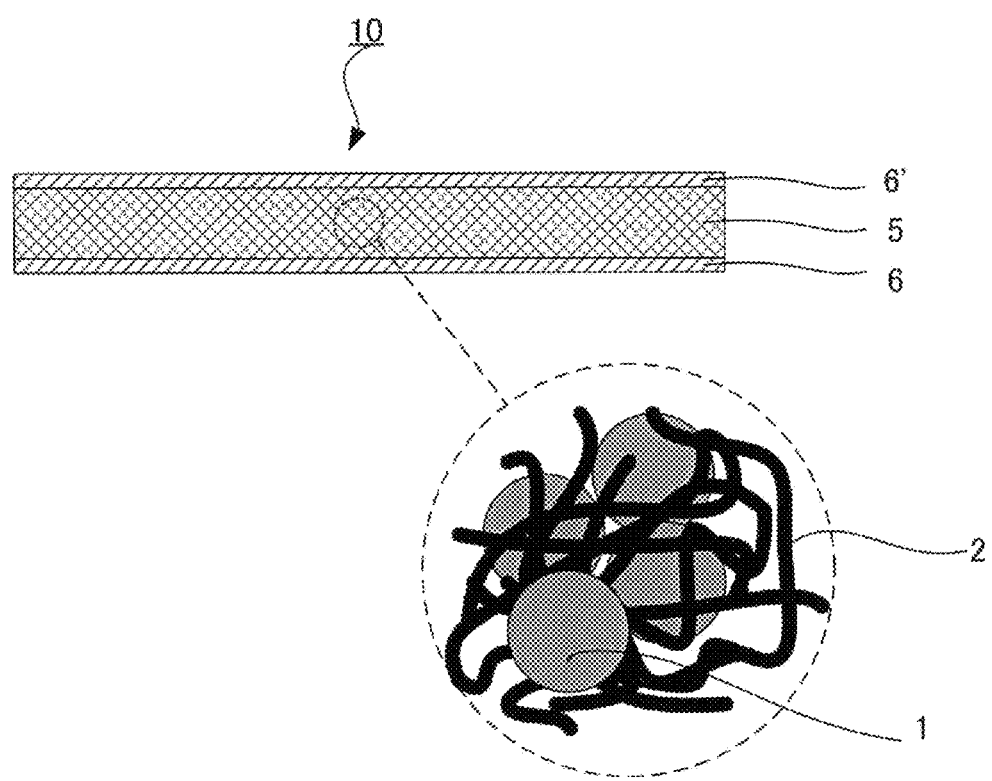
FIG. 2 is a schematic sectional view of another example of the structure of the separator for all-solid-state batteries according to the disclosed embodiments.

FIG. 2 is a schematic sectional view of another example of the structure of the separator for all-solid-state batteries according to the disclosed embodiments. The separator 10 for all-solid-state batteries shown in FIG. 2 comprises the first solid electrolyte layer 5 comprising the solid electrolyte 1, which is in the particulate form, and the hydrogenated rubber-based resin 2 bonding the solid electrolyte particles. The separator 10 optionally further comprises, on both surfaces of the first solid electrolyte layer 5, second solid electrolyte layers 6 and 6', in both of which the content of the hydrogenated rubber-based resin 2 is smaller than that in the first solid electrolyte layer 5.

As shown in FIG. 1, the separator for all-solid-state batteries according to the disclosed embodiments may be the first solid electrolyte layer itself, or as shown in FIG. 2, it may be a laminate of the first solid electrolyte layer and the second solid electrolyte layer.

Hereinafter, the components of the separator for all-solid-state batteries according to the disclosed embodiments, will be described in order.

(1) First Solid Electrolyte Layer
(1-1) Solid Electrolyte

As the solid electrolyte, examples include, but are not limited to, an oxide-based solid electrolyte and a sulfide-based solid electrolyte.

As the sulfide-based solid electrolyte, examples include, but are not limited to, materials composed of raw material compositions each containing $Li_2S$ and a sulfide of any one of the elements in groups 13 to 15 in the periodic table. As the elements in groups 13 to 15 in the periodic table, examples include, but are not limited to, B, Al, Si, Ge, P, As and Sb. As the sulfide of any one of the elements in groups 13 to 15 in the periodic table, examples include, but are not limited to, $B_2S_3$, $Al_2S_3$, $SiS_2$, $GeS_2$, $P_2S_3$, $P_2S_5$, $As_2S_3$ and $Sb_2S_3$.

In the disclosed embodiments, a sulfide solid electrolyte composed of a raw material composition containing $Li_2S$ and a sulfide of any one of elements in groups 13 to 15 in the periodic table, may be used. As the sulfide solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The halogen element may be one or more kinds of elements selected from the group consisting of F, Cl, Br and I. Also, the LiX contained in the raw material composition may be one or more kinds of LiX.

From the viewpoint of the ion conductivity, the LiX may be one or more kinds of lithium halide compounds selected from the group consisting of LiI, LiBr and LiCl.

From the viewpoint of increasing the ion conductivity, the solid electrolyte used in the disclosed embodiments may be a sulfide solid electrolyte comprising $Li_2S$, $P_2S_5$ and LiX.

As the sulfide solid electrolyte comprising $Li_2S$, $P_2S_5$ and LiX, examples include, but are not limited to, a composition represented by $a(LiX)\cdot(1-a)(bLi_2S\cdot(1-b)P_2S_5)$ where "a" is the total molar ratio of the LiX, and "b" is the molar ratio of the $Li_2S$.

From the viewpoint of the composition range in which high ion conductivity is obtained, "a" may be 0.1 or more and 0.3 or less, or it may be 0.15 or more and 0.25 or less.

Also, "b" may be 0.67 or more and 0.8 or less, or it may be 0.7 or more and 0.75 or less.

From the viewpoint of the ion conductivity, the solid electrolyte used in the disclosed embodiments may comprise a sulfide solid electrolyte comprising $Li_2S$, $P_2S_5$, LiI and LiBr.

When two or more kinds of LiX are contained, the mixing ratio is not particularly limited. For example, in the case of mixing LiI and LiBr, from the viewpoint of the composition range in which high ion conductivity is obtained, "c" in $cLiI\cdot(1-c)LiBr$ may be 0.01 or more and 0.99 or less, or it may be 0.25 or more and 0.95 or less, for example.

The sulfide solid electrolyte may be a sulfide glass, or it may be a crystallized sulfide glass obtained by heating the sulfide glass. The sulfide glass can be obtained by, for example, amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented. The crystallized sulfide glass can be obtained by, for example, heating the sulfide glass at a temperature equal to or higher than its crystallization temperature. That is, the crystallized sulfide glass can be obtained by amorphizing the raw material composition and heating the amorphized raw material composition at a temperature equal to or higher than its crystallization temperature.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

In the disclosed embodiments, as the form of the solid electrolyte, examples include, but are not limited to, a particulate form. More specifically, the particulate form may be a spherical or elliptical form. When the solid electrolyte is in a particulate form, the average particle diameter of the solid electrolyte particles may be in a range of from 0.01 μm to 100 μm, for example. Also, the average particle diameter may be in a range of from 0.05 μm to 20 μm, may be in a range of from 0.1 μm to 10 μm, or may be in a range of from 0.5 μm to 5 μm.

When the solid electrolyte is in a particulate form, as the average particle diameter of the solid electrolyte particles, a volume-based median diameter ($D_{50}$) measured by laser diffraction/scattering particle size distribution measurement, may be used. The average particle diameter of the solid electrolyte particles can be confirmed from values measured by image analysis using an electron microscope (such as SEM), for example.

As the solid electrolyte in the first solid electrolyte layer, one or more kinds of solid electrolytes may be used.

From the viewpoint of achieving both increased tensile strength and excellent ion conductivity, the content of the solid electrolyte in the first solid electrolyte layer may be in a range of from 70% by volume to 85% by volume, or it may be in a range of from 70% by volume to 80% by volume. Excellent ion conductivity can be obtained by combining the solid electrolyte with the below-described hydrogenated rubber-based resin and controlling the content of the solid electrolyte to 70% by volume or more. The tensile strength can be increased by combining the solid electrolyte with the below-described hydrogenated rubber-based resin and controlling the content of the solid electrolyte to 85% by volume or less.

(1-2) Hydrogenated Rubber-Based Resin

In the disclosed embodiments, the hydrogenated rubber-based resin is used to bond the above-described solid electrolyte particles. Since a rubber-based resin containing many unsaturated bonds easily reacts with the oxygen and sulfur atoms contained in the solid electrolyte, if the solid electrolyte reacts with the binder, they cannot retain their inherent properties and may result in a decrease in the ion conductivity of the solid electrolyte and a decrease in the elastic range of the binder. Meanwhile, the hydrogenated rubber-based resin has a high tensile elongation rate since, by the hydrogenation, the unsaturated bonds in the rubber are removed, thereby decreasing the reactivity of the rubber-based resin with the solid electrolyte and retaining rubber elasticity inherent in the hydrogenated rubber-based resin.

The hydrogenated rubber-based resin may be vulcanized or non-vulcanized. The hydrogenated rubber-based resin may be a material composed of carbon and hydrogen, or it may be a material such that all or part of hydrogen bound to carbon is substituted with halogen (such as fluorine).

Since the above-described solid electrolyte may react with polar solvent, the hydrogenated rubber-based resin used in the disclosed embodiments may be a rubber-based resin soluble in non-polar solvent (such as saturated hydrocarbon-based solvent, aromatic hydrocarbon-based solvent, fluorine-based solvent, and chlorine-based solvent).

Due to the above-reasons, as the hydrogenated rubber-based resin used in the disclosed embodiments, examples include, but are not limited to, hydrogenated butadiene rubber, hydrogenated styrene-butadiene rubber, hydrogenated styrene-butylene-styrene block rubber, hydrogenated butyl rubber, and hydrogenated isoprene rubber. In the disclosed embodiments, from the viewpoint of increasing the tensile strength, the hydrogenated rubber-based resin may be at least one of hydrogenated butadiene rubber and hydrogenated styrene-butadiene rubber, or it may be hydrogenated butadiene rubber. Also in the disclosed embodiments, from the viewpoint of achieving both increased tensile strength and excellent ion conductivity, a polar-group-modified, hydrogenated rubber-based resin may be used, which is obtained by introducing a polar group (such as an amino group) to a terminal of the hydrogenated rubber-based resin. By introducing a polar group such as an amino group, the adhesion strength of the interface between the solid electrolyte and the binder (the hydrogenated butadiene rubber) is increased (for example, the affinity of the binder for polyanion (such as $(PS_4)^{3-}$) in the sulfide solid electrolyte is increased). Accordingly, the tensile strength is presumed to be increased.

From the viewpoint of achieving both increased tensile strength and excellent ion conductivity, the hydrogenation rate of the hydrogenated rubber-based resin may be 90% or more, or it may be 95% or more, for example.

The number average molecular weight of the hydrogenated rubber-based resin may be in a range of from 1,000 to 700,000, may be in a range of from 10,000 to 100,000, or may be in a range of from 30,000 to 80,000, for example.

The hydrogenated rubber-based resin in the first solid electrolyte layer may be one or more kinds of hydrogenated rubber-based resins.

From the viewpoint of achieving both increased tensile strength and excellent ion conductivity, the content of the hydrogenated rubber-based resin in the first solid electrolyte layer is 15% by volume or more and 30% by volume or less, or it may be 20% by volume or more and 30% by volume or less.

The first solid electrolyte layer of the disclosed embodiments may be in a sheet form, for example. The thickness of the first solid electrolyte layer may be in a range of from 0.1 μm to 1000 μm, may be in a range of from 0.1 μm to 300 μm, or may be in a range of form 1 μm to 300 μm, for example.

(2) Second Solid Electrolyte Layer

The separator optionally further comprises, on at least one surface of the first solid electrolyte layer, a second solid electrolyte layer comprising a solid electrolyte and a hydrogenated rubber-based resin where a content of the hydrogenated rubber-based resin in the second solid electrolyte layer is 0.1% by volume or more and less than 15% by volume.

When the separator comprises, on at least one surface of the first solid electrolyte layer, the second solid electrolyte layer in which the content of the hydrogenated rubber-based resin is smaller than the first solid electrolyte layer, there are the following advantages, for example: the separator for all-solid-state batteries can be easily removed from the support in the production thereof, and an increase in the resistance of the interface between the electrode layers and the solid electrolyte layer, can be suppressed.

Considering the balance between the advantages and the adhesion strength of the interface between the electrode layers and the solid electrolyte layer, etc., it may be appropriately determined whether or not to dispose the second solid electrolyte layer. In the case of disposing the second solid electrolyte layer, it may be appropriately determined whether the second solid electrolyte layer is disposed on one surface of the first solid electrolyte layer or whether the second solid electrolyte layer is disposed on both surfaces of the first solid electrolyte layer.

The solid electrolyte and hydrogenated rubber-based resin used in the second solid electrolyte layer may be the same as those used in the first solid electrolyte layer.

The solid electrolyte used in the second solid electrolyte layer may be the same as or different from the solid electrolyte used in the first solid electrolyte layer.

The hydrogenated rubber-based resin used in the second solid electrolyte layer may be the same as or different from the hydrogenated rubber-based resin used in the first solid electrolyte layer.

When the second solid electrolyte layer is disposed on both surfaces of the first solid electrolyte layer, the two second solid electrolyte layers may be the same or different solid electrolyte layers.

The content of the hydrogenated rubber-based resin in the second solid electrolyte layer is 0.1% by volume or more and less than 15% by volume, from the point of view that the separator for all-solid-state batteries can be easily removed from the support in the production thereof, or a decrease in the ion conductivity can be suppressed. Also, the content of the hydrogenated rubber-based resin in the second solid electrolyte layer may be 0.1% by volume or more and 5% by volume or less, or it may be 0.5% by volume or more and 3% by volume or less.

From the viewpoint of suppressing a decrease in the ion conductivity, the content of the solid electrolyte in the second solid electrolyte layer may be more than 85% by volume and 99.9% by volume or less, may be 95% by volume or more and 99.9% by volume or less, or may be 97% by volume or more and 99.5% by volume or less.

When the first solid electrolyte layer is in a sheet form, the second solid electrolyte layer of the disclosed embodiments may be in a sheet form, too. The thickness of the (or each) second solid electrolyte layer may be, for example, in a range of from 0.1 μm to 1000 μm, or it may be in a range of from 0.1 μm to 300 μm, from the viewpoint of obtaining the separator for all-solid-state batteries, which is configured to achieve both increased tensile strength and excellent ion conductivity.

(3) Properties of the Separator for all-Solid-State Batteries

In the disclosed embodiments, from the viewpoint of increasing the tensile strength, the yield stress of the separator for all-solid-state batteries may be 0.1 N or more. The upper limit of the yield stress is not particularly limited. It may be 0.3 N or less, or it may be 0.2 N or less.

The yield stress can be obtained by a tensile test that will be described below in "Examples".

Also in the disclosed embodiments, from the viewpoint of increasing the tensile strength, the tensile fracture elongation rate of the separator for all-solid-state batteries may be 1% or more, or it may be 2% or more. The larger the tensile fracture elongation rate, the better. The upper limit of the tensile fracture elongation rate is not particularly limited.

The tensile fracture elongation rate can be obtained by the tensile test described below in "Examples".

2. Method for Producing the Separator for all-Solid-State Batteries

The method for producing the separator for all-solid-state batteries according to the disclosed embodiments, is not particularly limited, as long as it is a method by which the separator for all-solid-state batteries according to the disclosed embodiments is obtained. For example, the separator for all-solid-state batteries can be produced by the following separator production method of the disclosed embodiments.

The method for producing the separator for all-solid-state batteries according to the disclosed embodiments, is a method for producing the separator for all-solid-state batteries according to the disclosed embodiments, the method comprising:

preparing a solid electrolyte layer forming slurry comprising a solid electrolyte, a hydrogenated rubber-based resin and a dispersion medium, forming a precursor film by applying the solid electrolyte layer forming slurry on a support and drying the applied slurry, and pressing the precursor film at a temperature which is 0° C. or more, which is less than a decomposition temperature of the hydrogenated rubber-based resin, and which is less than a crystallization temperature of the solid electrolyte.

As shown in FIG. 1, when the separator 10 for all-solid-state batteries according to the disclosed embodiments is the first solid electrolyte layer 5 itself, to form the first solid electrolyte layer, the production method of the disclosed embodiments may comprise preparing a first solid electrolyte layer forming slurry comprising a solid electrolyte, a hydrogenated rubber-based resin and a dispersion medium, forming a first solid electrolyte layer precursor film by applying the first solid electrolyte layer forming slurry on a support and drying the applied slurry, and pressing the first solid electrolyte layer precursor film at a temperature which is 0° C. or more, which is less than the decomposition temperature of the hydrogenated rubber-based resin, and which is less than the crystallization temperature of the solid electrolyte.

As shown in FIG. 2, when the separator 10 for all-solid-state batteries according to the disclosed embodiments is a laminate of the first solid electrolyte layer 5 and the second solid electrolyte layers 6 and 6', the production method of the disclosed embodiments may comprise the following steps, for example:

preparing a first solid electrolyte layer forming slurry comprising a solid electrolyte, a hydrogenated rubber-based resin and a dispersion medium, preparing a second solid electrolyte layer forming slurry comprising a solid electrolyte, a hydrogenated rubber-based resin and a dispersion medium, forming a second solid electrolyte layer precursor film by applying the second solid electrolyte layer forming slurry on a support and drying the applied slurry, forming a first solid electrolyte layer precursor film by applying the first solid electrolyte layer forming slurry on the second solid electrolyte layer precursor film formed on the support and drying the applied slurry to form a laminate (a) in which the second solid electrolyte layer precursor film and the first solid electrolyte layer precursor film are disposed in this order on the support, and then any one of the following steps (A) to (C):

Step (A): Two laminates (a) are formed and stacked to ensure that the first solid electrolyte layer precursor films of the two laminates (a) face each other, thereby obtaining a laminate (b) in which, on the support of one laminate, the second solid electrolyte layer precursor film, the first solid electrolyte layer precursor film, the first solid electrolyte layer precursor film, the second solid electrolyte layer precursor film, and the support of the other laminate, are disposed in this order.

Step (B): A laminate (a') is formed by forming a second solid electrolyte layer precursor film on a support, and the laminates (a') and (a) are stacked to ensure that the second solid electrolyte layer precursor film of the laminate (a') and the first solid electrolyte layer precursor film of the laminate (a) face each other, thereby obtaining a laminate (b') in which, on the support of one laminate, the second solid electrolyte layer precursor film, the first solid electrolyte layer precursor film, the second solid electrolyte layer precursor film, and the support of the other laminate are disposed in this order.

Step (C): A laminate (c) is obtained by forming a second solid electrolyte layer precursor film by applying the second solid electrolyte layer forming slurry on the first solid electrolyte layer precursor film of the laminate (a) and drying the applied slurry.

Then, the production method of the disclosed embodiments further comprises pressing the laminate (b), the laminate (b') or the laminate (c) at a temperature which is 0° C. or more, which is less than the decomposition temperature of the hydrogenated rubber-based resin, and which is less than the crystallization temperature of the solid electrolyte, thereby obtaining the separator 10 for all-solid-state batteries, in which the second solid electrolyte layer 6, the first solid electrolyte layer 5, and the second solid electrolyte layer 6' are disposed in this order.

In the separator production method of the disclosed embodiments, as needed, the supports may be removed after the pressing.

(1) Preparing the Solid Electrolyte Layer Forming Slurry

First, the solid electrolyte layer forming slurry comprising a solid electrolyte, a hydrogenated rubber-based resin and a dispersion medium, is prepared.

The solid electrolyte and the hydrogenated rubber-based resin may be the same as those described above in "1. Separator for all-solid-state batteries". The content of the hydrogenated rubber-based resin is appropriately determined depending on the content of the target solid electrolyte layer, which is either the first solid electrolyte layer forming slurry or the second solid electrolyte layer forming slurry.

As the dispersion medium, a dispersion medium which has low reactivity with the solid electrolyte used and which has high hydrogenated rubber-based resin solubility, may be used. As the dispersion medium, examples include, but are not limited to, the following non-polar solvents: saturated hydrocarbon-based solvent such as pentane, hexane, heptane, octane, nonane, decane, undecane, dodecane, paraffin, cyclopentane, cyclohexane, cycloheptane, cyclooctane, and cycloparaffin; aromatic hydrocarbon-based solvent such as benzene, toluene, and xylene; fluorine-based solvent such as benzene fluoride, heptane fluoride, 2,3-dihydroperfluoropentane, and 1,1,2,2,3,3,4-heptafluorocyclopentane; chlorine-based solvent such as chloroform, methyl chloride, and methylene chloride; chain ether-based solvent such as diethyl ether and dimethyl ether; cyclic ether-based solvent such as tetrahydrofuran; and ester-based solvent such as ethyl acetate. As the dispersion medium, examples also include, but are not limited to, the following polar aprotic solvents: ketone-based solvent such as acetone; nitrile-based solvent such as acetonitrile; amide-based solvent such as N,N-dimethylformamide (DMF); and sulfoxide-based solvent such as dimethylsulfoxide (DMSO).

The method for mixing the solid electrolyte, the hydrogenated rubber-based resin and the dispersion medium is not particularly limited, as long as it is a method by which a slurry in which they are uniformly mixed and highly dispersed, is obtained. As the method, examples include, but are not limited to, a mixing method using a device such as a thin-film spin system high-speed mixer, a dissolver, a homomixer, a kneader, a roll mill, a sand mill, an atliter, a ball mill, a vibration mill, a high-speed impeller mill, an ultrasonic homogenizer and a shaking device.

From the viewpoint of productivity and yield, the solid content concentration of the solid electrolyte layer forming slurry may be 5% by mass or more, or it may be 10% by mass or more. On the other hand, the solid content concentration may be 80% by mass or less, or it may be 70% by mass or less. In the disclosed embodiments, "solid content" means components other than the dispersion medium. The solid content concentration can be calculated by dividing the mass of the total solid content of the slurry (e.g., the total mass of the solid electrolyte and the binder) by the total mass of the slurry.

(2) Forming the Precursor Film

Next, the step of forming the precursor film by applying the solid electrolyte layer forming slurry on the support and drying the applied slurry, will be described.

The support is not particularly limited, as long as the solid electrolyte layer forming slurry can be uniformly applied thereon. In general, a support in a sheet form may be used. As the support, examples include, but are not limited to, a metal foil such as an aluminum foil and a stainless-steel foil, and a resin film such as a PET film.

Also, the precursor film may be formed by using the below-described cathode or anode layer as the support and directly applying the solid electrolyte layer forming slurry on the cathode or anode layer and drying the applied slurry.

The slurry can be applied by a commonly-used wet coating method. As the method, examples include, but are not limited to, a doctor blade method, a die coating method, a gravure coating method, a spray coating method, an electrostatic coating method, and a bar coating method. The amount of the applied slurry can be appropriately determined depending on the desired thickness of the solid electrolyte layer.

For removal of the dispersion medium, the solid electrolyte layer forming slurry applied on the support, is dried by a method that can prevent the solid electrolyte and the hydrogenated rubber-based resin from deterioration, thereby forming the precursor film.

As the drying method, examples include, but are not limited to, heat drying, hot-air drying, infrared drying, reduced-pressure drying, and dielectric drying.

(3) Pressing

Next, the step of pressing the precursor film will be described.

In the disclosed embodiments, the precursor film is pressed at a temperature which is 0° C. or more, which is less than the decomposition temperature of the hydrogenated rubber-based resin, and which is less than the crystallization temperature of the solid electrolyte. In the disclosed embodiments, the solid electrolyte layer can be formed by using the hydrogenated rubber-based resin as the binder of the solid electrolyte layer and then pressing the precursor film at a temperature which is less than the decomposition temperature of the hydrogenated rubber-based resin. The temperature which is less than the decomposition temperature of the hydrogenated rubber-based resin, may be a temperature which is less than the melting point of the hydrogenated rubber-based resin. As just described, the solid electrolyte layer can be formed by pressing the precursor film at a relatively low temperature which is less than the decomposition temperature or melting point of the hydrogenated rubber-based resin and which is less than the crystallization temperature of the solid electrolyte. Accordingly, compared to the case of forming the solid electrolyte layer by high temperature heating at 250° C. or more, there are advantages in that the crystallization of the crystallized glass solid electrolyte does not proceed, and the solid electrolyte layer can retain high ion conductivity. If excess heat is applied to the solid electrolyte, the crystallization of the solid electrolyte proceeds, and the ion conductivity of the solid electrolyte may decrease.

In particular, the precursor film may be pressed at a temperature which is 0° C. or more and 170° C. or less, or it may be pressed at a temperature which is 20° C. or more and 50° C. or less.

The decomposition temperature and melting point of the hydrogenated rubber-based resin can be confirmed and measured by differential scanning calorimetry (DSC). The crystallization temperature of the solid electrolyte can be confirmed and measured by differential thermal analysis (DTA).

The pressure applied to the precursor film is not particularly limited. The lower limit of the pressure may be more than the atmospheric pressure, may be 0.2 ton/cm$^2$ ($\approx$19.6 MPa) or more, or may be 1 ton/cm$^2$ ($\approx$98 MPa) or more. The upper limit may be 600 MPa or less, or it may be 5 ton/cm$^2$ ($\approx$490 MPa) or less.

The method for pressing the precursor film is not particularly limited. As the pressing method, examples include, but are not limited to, plate pressing and roll pressing.

(4) Other Step

The support can be appropriately removed after forming the solid electrolyte layer by pressing the precursor film.

3. All-Solid-State Battery

The all-solid-state battery of the disclosed embodiments is an all-solid-state battery comprising a cathode layer, an anode layer, and a separator for all-solid-state batteries, which is disposed between the cathode layer and the anode layer, wherein the separator for all-solid-state batteries is the separator for all-solid-state batteries according to the disclosed embodiments.

Figure 3:
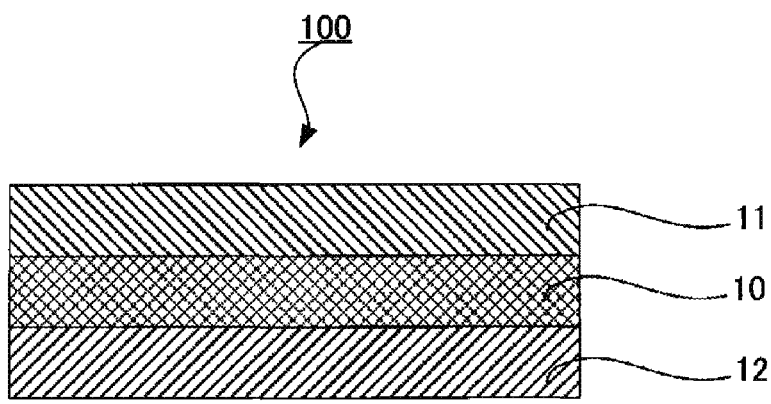
FIG. 3 is a schematic sectional view of an example of the power generation element of the all-solid-state battery according to the disclosed embodiments.

FIG. 3 is a schematic sectional view of an example of the power generation element of the all-solid-state battery according to the disclosed embodiments. A power generation element 100 shown in FIG. 3 comprises a cathode layer 11, an anode layer 12, and the separator 10 for all-solid-state batteries, which is disposed between the cathode layer 11 and the anode layer 12.

[Cathode Layer]

The cathode layer contains at least a cathode active material. As needed, it contains a solid electrolyte, an electroconductive material and a binder.

The type of the cathode active material is not particularly limited. As the cathode active material, examples include, but are not limited to, $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Co_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. It may be a particulate form.

As the solid electrolyte, examples include, but are not limited to, those exemplified above as the solid electrolyte of the separator for all-solid-state batteries.

As the electroconductive material, examples include, but are not limited to, carbonaceous materials such as acetylene black and Ketjen Black, fibrous carbon such as carbon fiber, and metal materials.

The binder is not particularly limited. As the binder, examples include, but are not limited to, styrene-butadiene rubber (SBR) and the above-described hydrogenated rubber-based resin.

The content of the cathode active material, solid electrolyte, electroconductive material and binder in the cathode layer, may be the same as those conventionally known.

The thickness of the cathode layer is not particularly limited. For example, it may be from 1 μm to 250 μm, or it may be from 10 μm to 200 μm.

[Anode Layer]

The anode layer contains at least an anode active material. As needed, it contains a solid electrolyte, an electroconductive material and a binder.

As the anode active material, a conventionally-known material may be used. As the material, examples include, but are not limited to, lithium metal (Li), lithium alloy, carbon, Si, Si alloy, and $Li_4Ti_5O_{12}$ (LTO).

As the lithium alloy, examples include, but are not limited to, LiSn, LiSi, LiAl, LiGe, LiSb, LiP and LiIn.

As the Si alloy, examples include, but are not limited to, an alloy with a metal such as Li and an alloy with at least one kind of metal selected from the group consisting of Sn, Ge and Al.

The form of the anode active material is not particularly limited. For example, it may be a particulate form or a thin film form.

The solid electrolyte, electroconductive material and binder used in the anode layer may be the same as those used in the cathode layer.

The content of the anode active material, solid electrolyte, electroconductive material and binder in the anode layer may be the same as those conventionally known.

The thickness of the anode layer is not particularly limited. It may be appropriately determined depending on desired performance.

[Cathode Current Collector and Anode Current Collector]

In the all-solid-state battery of the disclosed embodiments, a cathode current collector and an anode current collector, which are not shown in FIG. 3, are generally used. The cathode current collector collects current from the cathode layer. The cathode current collector is not particularly limited, as long as it functions as a cathode current collector. The material for the cathode current collector is not particularly limited, as long as it is an electroconductive material. As the material, examples include, but are not limited to, SUS (stainless-steel), aluminum, nickel, iron, titanium, copper and carbon. The cathode current collector may be a dense metal current collector or a porous metal current collector.

The anode current collector collects current from the anode layer. The anode current collector is not particularly limited, as long as it functions as an anode current collector. As the material for the anode current collector, examples include, but are not limited to, those exemplified above as the material for the cathode current collector.

The cathode and anode current collectors used in the disclosed embodiments may also function as a battery casing. For example, a battery casing made of SUS is prepared, and a part of the battery casing may be used to collect current.

[Other Component]

As needed, the all-solid-state battery comprises an outer casing for housing the cathode layer, the anode layer and the separator for all-solid-state batteries.

The form of the outer casing is not particularly limited. As the form, examples include, but are not limited to, a laminate form.

The material for the outer casing is not particularly limited, as long as it is stable in electrolyte. As the material, examples include, but are not limited to, resins such as polypropylene, polyethylene and acrylic resin.

As the all-solid-state battery, examples include, but are not limited to, an all-solid-state lithium battery, an all-solid-state lithium ion battery, an all-solid-state magnesium battery, an all-solid-state sodium battery and an all-solid-state calcium battery. The all-solid-state battery may be an all-solid-state lithium battery, an all-solid-state lithium ion battery, or an all-solid-state sodium battery. Also, the all-solid-state battery may be an all-solid-state lithium battery or an all-solid-state lithium ion battery.

As the form of the all-solid-state battery, examples include, but are not limited to, a coin form, a laminate form, a cylindrical form and a square form.

The method for producing the all-solid-state battery of the disclosed embodiments is not particularly limited, as long as it is a method by which the above-described all-solid-state battery is obtained. As the method, a common all-solid-state battery production method may be used. For example, the all-solid-state battery of the disclosed embodiments may be produced by the following method: the material for the cathode layer, the separator for all-solid-state batteries, and the material for the anode layer are pressed in order, thereby producing a power generation element; this power generation element is stored in the battery casing; and the battery casing is swaged, thereby producing the all-solid-state battery.

EXAMPLES

Example 1

(1) Preparing a First Solid Electrolyte Layer Forming Slurry

As a solid electrolyte, 0.400 g of 10LiI-15LiBr-75 (3Li$_2$S—P$_2$S$_5$) (particle diameter: 2 μm, density (d): 2.21 g/cm$^3$, crystallization temperature: about 180° C.) was weighed out. Also, 0.639 g of a 5% by mass heptane solution of amine-modified, hydrogenated butadiene rubber (density (d): 1 g/cm$^3$, decomposition temperature: 200° C. or more) and an appropriate amount of dehydrated heptane were weighed out. They are mixed and dispersed for 30 seconds by use of an ultrasonic homogenizer. Then, the resulting mixture was shaken only once by a shaking device, thereby preparing a first solid electrolyte layer forming slurry 1 in which the amine-modified, hydrogenated butadiene rubber was 15% by volume in solid content equivalent (excluding heptane used as a dispersion medium).

(2) Preparing a Second Solid Electrolyte Layer Forming Slurry

A second solid electrolyte layer forming slurry was prepared in the same manner as the first solid electrolyte layer forming slurry, except that the content of the 5% by mass heptane solution of amine-modified, hydrogenated butadiene rubber, was changed to 0.032 g to ensure that the amine-modified, hydrogenated butadiene rubber was 0.9% by volume in solid content equivalent.

(3) Producing a Separator for all-Solid-State Batteries

The second solid electrolyte layer forming slurry (in which the rubber was 0.9% by volume in solid content concentration) was applied on an Al foil by use of a doctor blade (application gap: 75 μm). The applied slurry was naturally dried for one hour and then dried on a hot plate at 100° C. for 30 minutes to obtain a second solid electrolyte layer precursor film.

By use of a doctor blade (application gap: 250 μm), the first solid electrolyte layer forming slurry (in which the rubber was 15% by volume in solid content equivalent) was applied on the second solid electrolyte layer precursor film formed on the Al foil. The applied slurry was naturally dried for one hour and then dried on the hot plate at 100° C. for 30 minutes to produce a first solid electrolyte layer precursor film, thereby obtaining a laminate (a) in which, on the Al foil, the second solid electrolyte layer precursor film and the first solid electrolyte layer precursor film were disposed in this order.

The laminate (a) was cut into two equal parts, thereby obtaining two laminates.

The two laminates were stacked to ensure that the first solid electrolyte layer precursor films of the two laminates faced each other, thereby obtaining a laminate (b) in which the Al foil, the second solid electrolyte layer precursor film, the first solid electrolyte layer precursor film, the first solid electrolyte layer precursor film, the second solid electrolyte layer precursor film, and the Al foil, were disposed in this order.

The laminate (b) was pressed at a compacting pressure of from 0.2 t/cm$^2$ to 0.3 t/cm$^2$ (≈19.6 MPa to 29.4 MPa) at normal temperature (25° C.). Then, the Al foils were removed from both surfaces of the laminate (b), thereby producing the separator for all-solid-state batteries of Example 1.

The thus-obtained separator for all-solid-state batteries of Example 1 was a laminate in which the second solid electrolyte layer (5 μm), the first solid electrolyte layer (80 μm) and the second solid electrolyte layer (5 μm) were disposed in this order.

Example 2

The first solid electrolyte layer forming slurry 2 of Example 2 was prepared in the same manner as Example 1, except that in "(1) Preparing a first solid electrolyte layer forming slurry", the content of the 5% by mass heptane solution of amine-modified, hydrogenated butadiene rubber, was changed to 0.905 g to ensure that the amine-modified, hydrogenated butadiene rubber was 20% by volume in solid content equivalent.

The separator for all-solid-state batteries of Example 2 was produced in the same manner as Example 1, except that in "(3) Producing a separator for all-solid-state batteries", the first solid electrolyte layer forming slurry 2 of Example 2 was used in place of the first solid electrolyte layer forming slurry 1 of Example 1.

The thus-obtained separator for all-solid-state batteries of Example 2 was a laminate in which the second solid electrolyte layer (5 μm), the first solid electrolyte layer (80 μm) and the second solid electrolyte layer (5 μm) were disposed in this order.

Example 3

The first solid electrolyte layer forming slurry 3 of Example 3 was prepared in the same manner as Example 1, except that in "(1) Preparing a first solid electrolyte layer forming slurry", the content of the 5% by mass heptane solution of amine-modified, hydrogenated butadiene rubber, was changed to 1.552 g to ensure that the amine-modified, hydrogenated butadiene rubber was 30% by volume in solid content equivalent.

The separator for all-solid-state batteries of Example 3 was produced in the same manner as Example 1, except that in "(3) Producing a separator for all-solid-state batteries", the first solid electrolyte layer forming slurry 3 of Example 3 was used in place of the first solid electrolyte layer forming slurry 1 of Example 1.

The thus-obtained separator for all-solid-state batteries of Example 3 was a laminate in which the second solid electrolyte layer (5 μm), the first solid electrolyte layer (80 μm) and the second solid electrolyte layer (5 μm) were disposed in this order.

Comparative Example 1

The comparative solid electrolyte layer forming slurry C1 of Comparative Example 1 was prepared in the same manner as Example 1, except that in "(1) Preparing a first solid electrolyte layer forming slurry", a 5.6% by mass butyl butyrate solution of polyvinylidene fluoride, was used in place of the 5% by mass heptane solution of amine-modified, hydrogenated butadiene rubber, and the content of the 5.6% by mass butyl butyrate solution of polyvinylidene fluoride was set to 2.823 g to ensure that the polyvinylidene fluoride was 30% by volume in solid content concentration.

It was tried to produce the separator for all-solid-state batteries of Comparative Example 1 in the same manner as Example 1, except that in "(3) Producing a separator for all-solid-state batteries", the second solid electrolyte layer precursor film was not formed on the Al foil, and the comparative solid electrolyte layer forming slurry C1 of Comparative Example 1 was used in place of the first solid electrolyte layer forming slurry of Example 1. In Comparative Example 1, however, a self-supporting film was not obtained as a result of removing the Al foils from both surfaces of the laminate. Accordingly, the below-described tensile test was not carried out.

Comparative Example 2

The comparative solid electrolyte layer forming slurry C2 of Comparative Example 2 was prepared in the same manner as Example 1, except that in "(1) Preparing a first solid electrolyte layer forming slurry", the content of the 5% by mass heptane solution of amine-modified, hydrogenated butadiene rubber, was changed to 0.032 g to ensure that the amine-modified, hydrogenated butadiene rubber was 0.9% by volume in solid content equivalent.

It was tried to produce the separator for all-solid-state batteries of Comparative Example 2 in the same manner as Example 1, except that in "(3) Producing a separator for all-solid-state batteries", the second solid electrolyte layer precursor film was not formed on the Al foil, and the comparative solid electrolyte layer forming slurry C2 of Comparative Example 2 was used in place of the first solid electrolyte layer forming slurry of Example 1. In Comparative Example 2, however, a self-supporting film was not obtained as a result of removing the Al foils from both surfaces of the laminate. Accordingly, the below-described tensile test was not carried out.

Comparative Example 3

The comparative solid electrolyte layer forming slurry C3 of Comparative Example 3 was prepared in the same manner as Example 1, except that in "(1) Preparing a first solid electrolyte layer forming slurry", the content of the 5% by mass heptane solution of amine-modified, hydrogenated butadiene rubber, was changed to 0.191 g to ensure that the amine-modified, hydrogenated butadiene rubber was 5% by volume in solid content equivalent.

It was tried to produce the separator for all-solid-state batteries of Comparative Example 3 in the same manner as Example 1, except that in "(3) Producing a separator for all-solid-state batteries", the comparative solid electrolyte layer forming slurry C3 of Comparative Example 3 was used in place of the first solid electrolyte layer forming slurry of Example 1. In Comparative Example 3, however, a self-supporting film was not obtained as a result of removing the Al foils from both surfaces of the laminate. Accordingly, the below-described tensile test was not carried out.

Comparative Example 4

The comparative solid electrolyte layer forming slurry C4 of Comparative Example 4 was prepared in the same manner as Example 1, except that in "(1) Preparing a first solid electrolyte layer forming slurry", the content of the 5% by mass heptane solution of amine-modified, hydrogenated butadiene rubber, was changed to 0.402 g to ensure that the amine-modified, hydrogenated butadiene rubber was 10% by volume in solid content equivalent.

It was tried to produce the separator for all-solid-state batteries of Comparative Example 4 in the same manner as Example 1, except that in "(3) Producing a separator for all-solid-state batteries", the comparative solid electrolyte layer forming slurry C4 of Comparative Example 4 was used in place of the first solid electrolyte layer forming slurry of Example 1. In Comparative Example 4, however, a self-supporting film was not obtained as a result of removing the Al foils from both surfaces of the laminate. Accordingly, the below-described tensile test was not carried out.

[Evaluation]

(1) Li Ion Conductivity

For each example, the first solid electrolyte layer forming slurry was applied on a support; the applied slurry was dried on the hot plate at 100° C. for 30 minutes to form a first solid electrolyte layer; the first solid electrolyte layer was pulverized; the pulverized first solid electrolyte layer, which was a solid electrolyte mixture, was weighed out in accordance with Table 1, the solid electrolyte mixture comprising the solid electrolyte and the binder, and the weighed pulverized first solid electrolyte layer was placed between carbon-coated Al foils; the resulting laminate was sandwiched between stainless-steel (SUS) pins; and while being in this state, the laminate was pressed at a pressure of 6 t/cm$^2$ (≈588 MPa) at room temperature (25° C.) and then bolted at a torque of 6 Nm, thereby obtaining a cell for ion conductivity measurement.

The cell for ion conductivity measurement was installed in an AC impedance measuring device (product name: SOLATRON 1260, manufactured by: Solartron Analytical). The AC impedance measurement (25° C.) of the cell was carried out at an applied voltage of 10 mV in a measurement frequency range of from 1 MHz to 1 kHz, thereby obtaining a resistance.

The ion conductivity of the cell was calculated from the resistance and a pellet thickness. The result is shown in Table 2.

TABLE 1

|  | Binder (% by volume) | Amount (mg) of solid electrolyte mixture used in cell for ion conductivity measurement | True density (g/cc) |
| --- | --- | --- | --- |
| Comparative Example 1 | 30 | 94.5 | 2.09 |
| Comparative Example 2 | 0.9 | 99.5 | 2.2 |
| Comparative Example 3 | 5 | 97.3 | 2.15 |
| Comparative Example 4 | 10 | 94.5 | 2.09 |
| Example 1 | 15 | 91.8 | 2.03 |
| Example 2 | 20 | 89.1 | 1.97 |
| Example 3 | 30 | 83.6 | 1.85 |

Depending on the true density, the amount of the solid electrolyte mixture was controlled to obtain a uniform pellet thickness when 100% by volume of the pellet was composed of only the solid electrolyte mixture.

(2) Tensile Test

Figure 4:
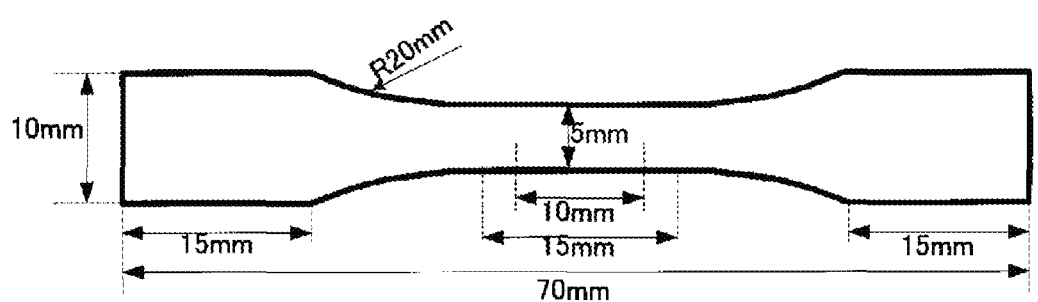
FIG. 4 is a view showing the shape of a tensile test specimen of the separator for all-solid-state batteries according to the disclosed embodiments.

For each example, a specimen of the separator for all-solid-state batteries was produced as follows. In "(3) Producing a separator for all-solid-state batteries", in the stage after the pressing at a pressure of from 0.2 t/cm² to 0.3 t/cm² (≈19.6 MPa to 29.4 MPa) and before the removal of the Al foils, the separator for all-solid-state batteries was punched out into the dumbbell shape shown in FIG. 4, thereby obtaining a dumbbell-shaped specimen. Next, the Al foils were removed from both surfaces of the specimen.

In a dry room at a dew point of about −40° C., the tensile test of the specimen was carried out by use of an autograph (product name: STB-1225S, manufactured by: A&D Co., Ltd.) at a tensile rate of 1 mm/min.

The results of the tensile test (yield stress, tensile fracture elongation and elongation rate) are shown in Table 2.

The elongation rate was obtained from the tensile fracture elongation based on 10 mm, which is the gauge length of the specimen.

As shown by Comparative Example 1 in Table 2, it was found that in the case of using polyvinylidene fluoride (PVDF) as the binder, even with the addition of 30% by volume of the binder, the self-supporting film for the tensile test could not be formed, and low ion conductivity was obtained.

In Comparative Examples 2 to 4, the solid electrolyte and the hydrogenated rubber-based resin were contained as the binder, and the content of the hydrogenated rubber-based resin was smaller than the amount specified in the disclosed embodiments. Even in such Comparative Examples 2 to 4, the self-supporting film for the tensile test could not be formed.

Meanwhile, for the separators for all-solid-state batteries of Examples 1 to 3, each comprising the first solid electrolyte layer which contained the solid electrolyte and the hydrogenated rubber-based resin and in which the content of the hydrogenated rubber-based resin was 15% by volume or more and 30% by volume or less, a practical Li ion conductivity of 0.1 mS/cm or more could be achieved. Accordingly, it was proved that they had excellent ion conductivity.

For the separators for all-solid-state batteries of Examples 1 to 3, each comprising the first solid electrolyte layer which contained the solid electrolyte and the hydrogenated rubber-based resin and in which the content of the hydrogenated rubber-based resin was 15% by volume or more and 30% by volume or less, the self-supporting film for the tensile test could be formed, and it was shown that a yield stress of 0.1 N or more could be achieved. Accordingly, an increase in the tensile strength was proved.

As just described, the separator for all-solid-state batteries according to the disclosed embodiments, is a separator configured to achieve both increased tensile strength and excellent ion conductivity.

By using such a separator for all-solid-state batteries in an all-solid-state battery, cracking and fracturing of the separator can be suppressed in production steps, and cracking and fracturing of the separator in the all-solid-state battery can be suppressed. In addition, the all-solid-state battery thus obtained is suppressed from a decrease in battery properties.

REFERENCE SIGNS LIST

1. Solid electrolyte
2. Hydrogenated rubber-based resin

TABLE 2

|  | Type of binder | Binder amount (% by volume) | Li ion conductivity (mS/cm) | Yield stress (N) | Tensile fracture elongation (mm) | Elongation rate (%) |
| --- | --- | --- | --- | --- | --- | --- |
| Comparative Example 1 | PVDF | 30 | 0.04 | Unmeasurable | Unmeasurable | Unmeasurable |
| Comparative Example 2 | Hydrogenated BR | 0.9 | 2.5 | Unmeasurable | Unmeasurable | Unmeasurable |
| Comparative Example 3 | Hydrogenated BR | 5 | 1.5 | Unmeasurable | Unmeasurable | Unmeasurable |
| Comparative Example 4 | Hydrogenated BR | 10 | 0.9 | Unmeasurable | Unmeasurable | Unmeasurable |
| Example 1 | Hydrogenated BR | 15 | 0.6 | 0.1 | 0.2 | 2 |
| Example 2 | Hydrogenated BR | 20 | 0.3 | 0.15 | 0.7 | 7 |
| Example 3 | Hydrogenated BR | 30 | 0.1 | 0.2 | 1 | 10 |

Hydrogenated BR: Amine-modified, hydrogenated butadiene rubber
PVDF: Polyvinylidene fluoride 5. First solid electrolyte layer
6, 6'. Second solid electrolyte layer
10. Separator for all-solid-state batteries
11. Cathode layer
12. Anode layer
100. Power generation element

The invention claimed is:

1. A separator for all-solid-state batteries, the separator comprising a first solid electrolyte layer comprising a solid electrolyte and a hydrogenated rubber-based resin where a content of the hydrogenated rubber-based resin in the first solid electrolyte layer is 15% by volume or more and 30% by volume or less, and the separator further comprising, on at least one surface of the first solid electrolyte layer, a second solid electrolyte layer comprising a solid electrolyte and a hydrogenated rubber-based resin where a content of the hydrogenated rubber-based resin in the second solid electrolyte layer is 0.1% by volume or more and less than 15% by volume.

2. The separator for all-solid-state batteries according to claim 1, wherein the solid electrolyte of the first solid electrolyte layer and that of the second solid electrolyte layer comprise a sulfide solid electrolyte comprising $Li_2S$, $P_2S_5$, LiI and LiBr.

3. A method for producing the separator for all-solid-state batteries defined by claim 1, the method comprising:

preparing a solid electrolyte layer forming slurry comprising a solid electrolyte, a hydrogenated rubber-based resin and a dispersion medium, forming a precursor film by applying the solid electrolyte layer forming slurry on a support and drying the applied slurry, and pressing the precursor film at a temperature which is 0° C. or more, which is less than a decomposition temperature of the hydrogenated rubber-based resin, and which is less than a crystallization temperature of the solid electrolyte.

4. An all-solid-state battery comprising a cathode layer, an anode layer, and a separator for all-solid-state batteries, which is disposed between the cathode layer and the anode layer, wherein the separator for all-solid-state batteries is the separator for all-solid-state batteries defined by claim 1.

* * * * *